(12) United States Patent
Van Swearingen

(10) Patent No.: US 9,853,408 B2
(45) Date of Patent: *Dec. 26, 2017

(54) CORRUGATED SOLDER PRE-FORM AND METHOD OF USE

(71) Applicant: CommScope Technologies LLC, Hickory, NC (US)

(72) Inventor: Kendrick Van Swearingen, Woodridge, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,451

(22) Filed: Oct. 25, 2016

(65) Prior Publication Data

US 2017/0040766 A1    Feb. 9, 2017

Related U.S. Application Data

(60) Division of application No. 14/110,538, filed as application No. PCT/US2012/024000 on Feb. 6, (Continued)

(51) Int. Cl.

| | | |
|---|---|---|
| *H01R 43/02* | (2006.01) | |
| *H01R 9/05* | (2006.01) | |
| *B23K 35/362* | (2006.01) | |
| *B23K 1/20* | (2006.01) | |
| *B23K 35/02* | (2006.01) | |
| *B23K 1/00* | (2006.01) | |
| *B23K 101/38* | (2006.01) | |
| *B23K 103/10* | (2006.01) | |

(52) U.S. Cl.
CPC .......... *H01R 43/02* (2013.01); *B23K 1/0016* (2013.01); *B23K 1/203* (2013.01);
(Continued)

(58) Field of Classification Search
CPC .. B23K 35/0227; B23K 35/406; B23K 35/40; B23K 1/00; B23K 1/18; B23K 2201/32;
(Continued)

(56) References Cited

U.S. PATENT DOCUMENTS

| 2,664,844 | A | | 1/1954 | Bruno | |
|---|---|---|---|---|---|
| 5,029,748 | A | * | 7/1991 | Lauterbach | ............ B23K 3/087 228/180.1 |

(Continued)

FOREIGN PATENT DOCUMENTS

| EP | 1343179 A2 | 9/2003 |
|---|---|---|
| GB | 692710 A | 6/1953 |

OTHER PUBLICATIONS

Extended European Search Report Corresponding to European Application No. 12770778.4, dated Jan. 8, 2016; 9 Pages.
(Continued)

*Primary Examiner* — Erin Saad
(74) *Attorney, Agent, or Firm* — Myers Bigel, P.A.

(57) ABSTRACT

A solder pre-form for soldering a coaxial cable to a connector body is provided with a plurality of flux grooves on a cable side and a connector side. The solder pre-form may also have a plurality of holes between the cable and connector sides. In a method of use, flux is applied to the flux grooves and the solder pre-form applied to encircle the outer conductor which is then inserted into the connector body and the solder pre-form melted to complete the solder interconnection. Where holes are present, flux may be applied to the connector side, passing through the holes also to the cable side.

18 Claims, 18 Drawing Sheets

Related U.S. Application Data 2012, now Pat. No. 9,515,444, which is a continuation of application No. 13/084,136, filed on Apr. 11, 2011, now abandoned.

(52) U.S. Cl.
CPC ........ *B23K 35/0222* (2013.01); *B23K 35/362* (2013.01); *H01R 9/05* (2013.01); *B23K 2201/38* (2013.01); *B23K 2203/10* (2013.01)

(58) Field of Classification Search
CPC ................ B23K 35/02; B23K 35/0222; B23K 35/0261; B23K 35/0266; Y10T 29/49117; H01R 9/05; H01R 9/0518; H01R 4/022
USPC ........ 228/56.3, 246, 199, 223, 13, 215, 224; 148/23
See application file for complete search history.

(56) References Cited

U.S. PATENT DOCUMENTS

| | | |
|---|---|---|
| 5,061,827 A | 10/1991 | Grabbe |
| 5,137,470 A | 8/1992 | Doles |
| 5,154,636 A | 10/1992 | Vaccaro et al. |
| 5,167,533 A | 12/1992 | Rauwolf |
| 5,281,167 A | 1/1994 | Le et al. |
| 5,354,217 A | 10/1994 | Gabel et al. |
| 5,561,900 A | 10/1996 | Hosler |
| 5,802,710 A | 9/1998 | Bufanda et al. |
| 6,264,062 B1 | 7/2001 | Lack et al. |
| 6,347,901 B1 | 2/2002 | Park et al. |
| 6,439,924 B1 | 8/2002 | Koolman |
| 6,471,545 B1 | 10/2002 | Hosler et al. |
| 6,716,061 B2 | 4/2004 | Pitschi et al. |
| 6,840,803 B2 | 1/2005 | Wlos et al. |
| 7,070,447 B1 | 7/2006 | Montena |
| 7,351,101 B1 | 4/2008 | Montena |
| 7,458,851 B2 | 12/2008 | Montena |
| 7,900,344 B2 | 3/2011 | Ng et al. |
| 2003/0168241 A1 | 9/2003 | Nelson et al. |
| 2003/0181100 A1 | 9/2003 | Kuroda et al. |
| 2008/0194142 A1 | 8/2008 | Wlos |
| 2009/0014093 A1 | 1/2009 | Campbell et al. |

OTHER PUBLICATIONS

Song Geun Bae, International Search Report for corresponding PCT application PCT/US12/024000, dated Sep. 25, 2012, Daejeon Metropolitan City, Korea.

* cited by examiner

CORRUGATED SOLDER PRE-FORM AND METHOD OF USE

CROSS REFERENCE TO RELATED APPLICATIONS

The present application claims priority under 35 U.S.C. §120 to U.S. application Ser. No. 14/110,538, filed Nov. 14, 2013, which itself is a 35 U.S.C. §371 national stage application of PCT International Application No. PCT/US2012/024000, filed on Feb. 6, 2012 which in turn claims priority from U.S. application Ser. No. 13/084,136, filed Apr. 11, 2011, the entire contents of each of which are incorporated by reference herein in their entirety.

BACKGROUND OF THE INVENTION

This invention relates to a solder pre-form. More specifically, the invention relates to a solder pre-form with improved flux application and distribution characteristics for soldering a coaxial connector to the outer conductor of a coaxial cable.

DESCRIPTION OF RELATED ART

Coaxial cables and coaxial connectors are used, for example, in communication systems requiring a high level of precision and reliability. To create a reliable and cost efficient electro-mechanical interconnection between the coaxial cable and the coaxial connector, it is often desirable to interconnect the cable and connector via soldering.

Solder pre-forms may be utilized to improve interconnection quality when soldering coaxial connectors to coaxial cables. The use of a solder pre-form standardizes the location and amount of solder applied. Representative of this technology is commonly owned U.S. Pat. No. 5,802,710 issued Sep. 8, 1998 to Bufanda et al (Bufanda). Bufanda discloses a solder pre-form with a planar connector side (outer surface) and a cable side (inner surface) dimensioned to key with corrugations of an annular corrugated outer conductor. Other solder pre-forms, for example for soldering a coaxial connector with a smooth sidewall outer conductor coaxial cable, have been provided as a plurality of annular rings and/or a cylindrical tube.

Aluminum material exposed to air quickly oxidizes, forming an aluminum oxide coating that interferes with solder bonding. Special aluminum material specific soldering flux with a heat activated high acid content may be used to prepare aluminum material surfaces for soldering. However, such flux may be difficult to apply evenly within the interconnection area.

Therefore, it is an object of the invention to provide a solder pre-form and method of use that overcomes deficiencies in such prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

The inventor has recognized that significant difficulties arise when attempting to solder a coaxial connector to a smooth sidewall outer conductor coaxial cable when the connector body and/or coaxial cable outer conductor are aluminum material.

The inventor's analysis indicates that, due to the speed of the aluminum oxide coating formation, if the aluminum material surfaces to be soldered are not coated with the flux immediately prior to initiation of heating to melt the solder pre-form, the quality of the resulting solder interconnection may be degraded. When the flux is heated as soldering is initiated, the flux volatizes, wetting and acid washing away the aluminum oxide coating likely present on the aluminum material surfaces, immediately prior to the melting of the solder pre-form to solder these surfaces together.

When utilizing the prior solder pre-forms, for example with a smooth connector side or multiple solder pre-form ring configuration, inventor's testing has shown that during insertion of the prepared end of the coaxial cable into the connector body bore any flux that may be present on the connector side of the solder pre-form and/or that may have been manually applied to the connector body bore may be partially or entirely scraped off. Thereby, the flux is prevented from acting upon the aluminum oxide coatings on the aluminum material surfaces immediately prior to melting of the solder pre-form during the solder procedure resulting in degraded solder interconnection quality. In particular, circumferential uniformity of the solder joint around the inner diameter of the connector body bore and/or outer diameter of the outer conductor may be degraded, which can be a significant characteristic of interconnection quality for high frequency applications.

The inventor has recognized that flux may be retained proximate the interconnection surfaces during cable end insertion into the connector body bore by providing a solder pre-form with flux grooves on both sides of the solder pre-form. The inventor has also recognized that the retention and flow of flux within the interconnection area may be further facilitated by providing the solder pre-form with holes, enabling a method of use in which flux application by the operator is only required with respect to the connector side of the solder pre-form.

Figure 1:
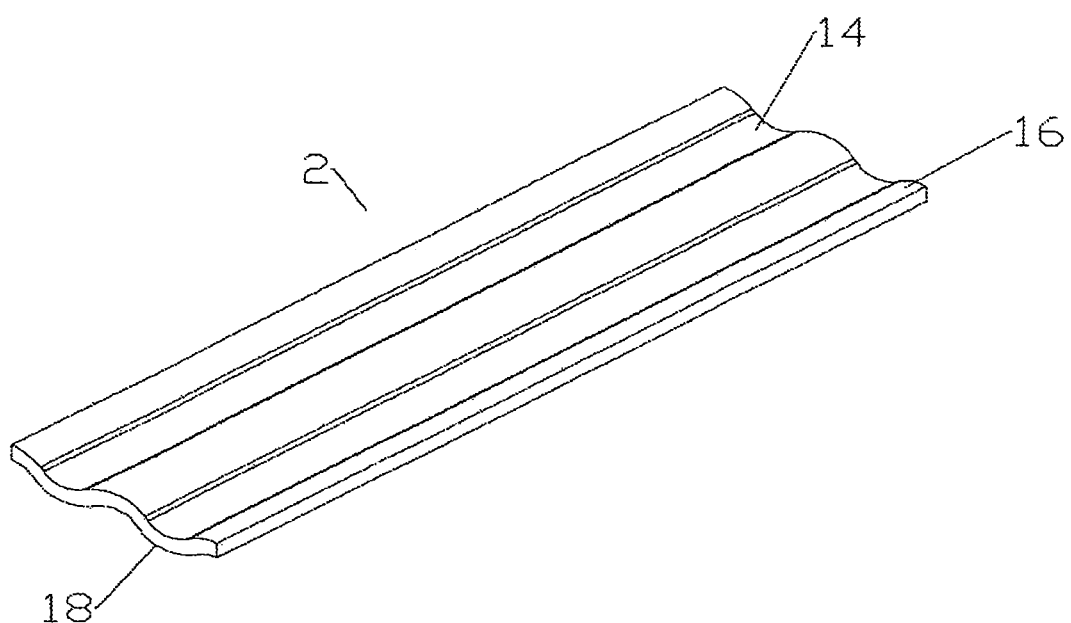
FIG. 1 is a schematic isometric view of a solder pre-form.
Figure 2:
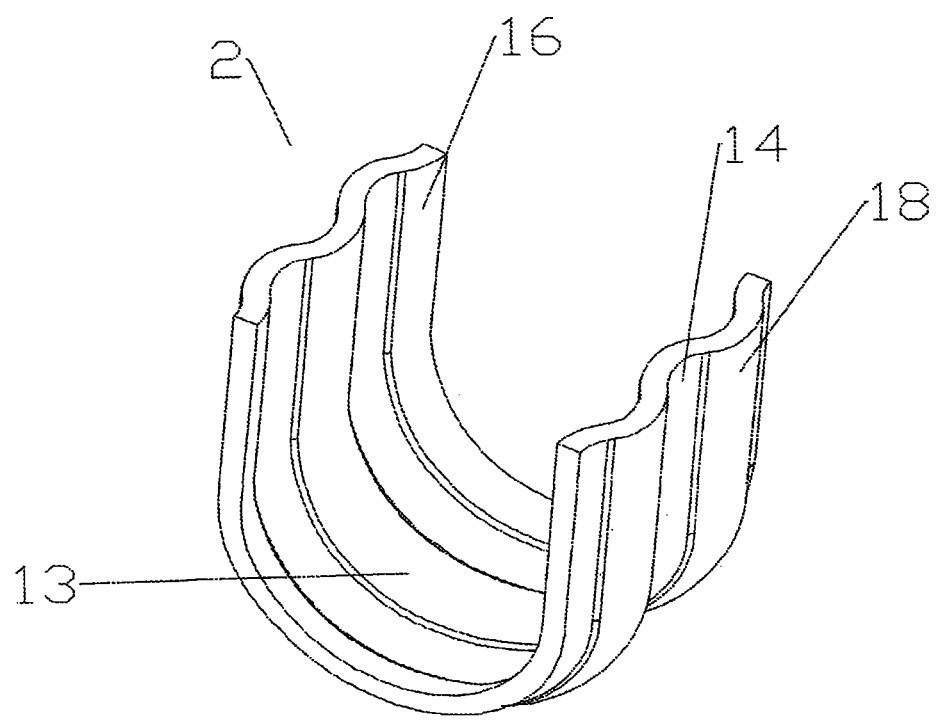
FIG. 2 is a schematic isometric view of the solder pre-form of FIG. 1 bent into a U-shape.
Figure 3:
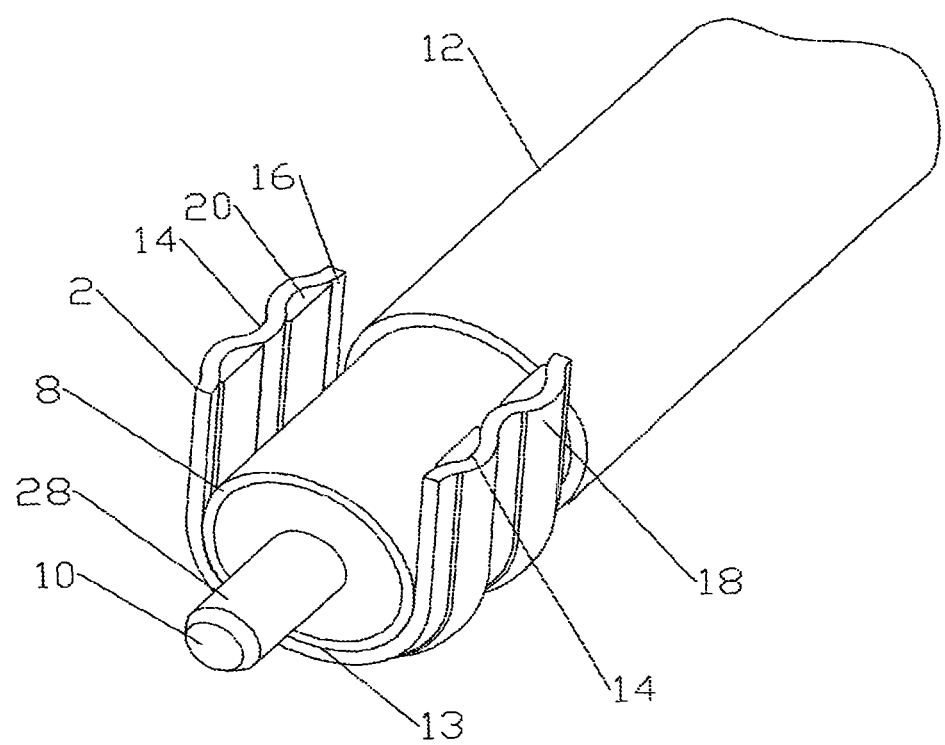
FIG. 3 is a schematic isometric view of the solder pre-form of FIG. 2 with a coaxial cable seated within the solder pre-form.

A first exemplary embodiment of a solder pre-form 2 for soldering a connector body 4 of a coaxial connector 6 with an outer conductor 8 of a prepared end 10 of a coaxial cable 12 is shown in FIGS. 1-3. The solder pre-form 2 may be provided as a planar sheet, as shown in FIG. 1. Alternatively, to facilitate wrapping accuracy and/or uniformity of the solder pre-form fit around the outer conductor 8 of the coaxial cable 12, the solder pre-form 2 may be provided formed as a U-shaped unit, for example as shown in FIG. 2. The U-shape is dimensioned to cradle the outer diameter of the coaxial cable 12 within the base 13 of the U-shape, as shown in FIG. 3. When the first and second ends of the pre-form 2 ends are bent towards one another around the outer conductor 8, for example with a hand tool such as pliers customized for a specific desired diameter and/or flux groove 14 configuration, the solder pre-form 2 encircles the outer conductor 8 as shown for example in FIG. 4.

Figure 5:
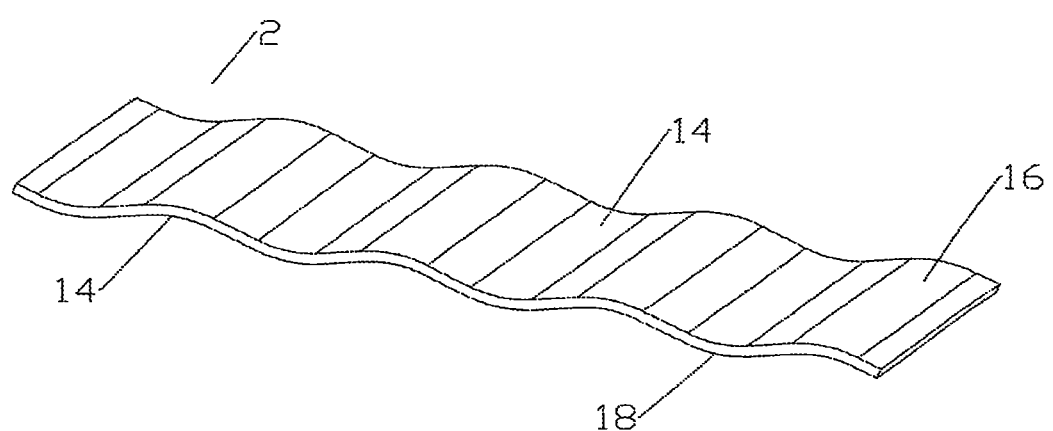
FIG. 5 is a schematic isometric view of an embodiment of a solder pre-form with flux grooves perpendicular to a longitudinal axis of the solder pre-form.
Figure 6:
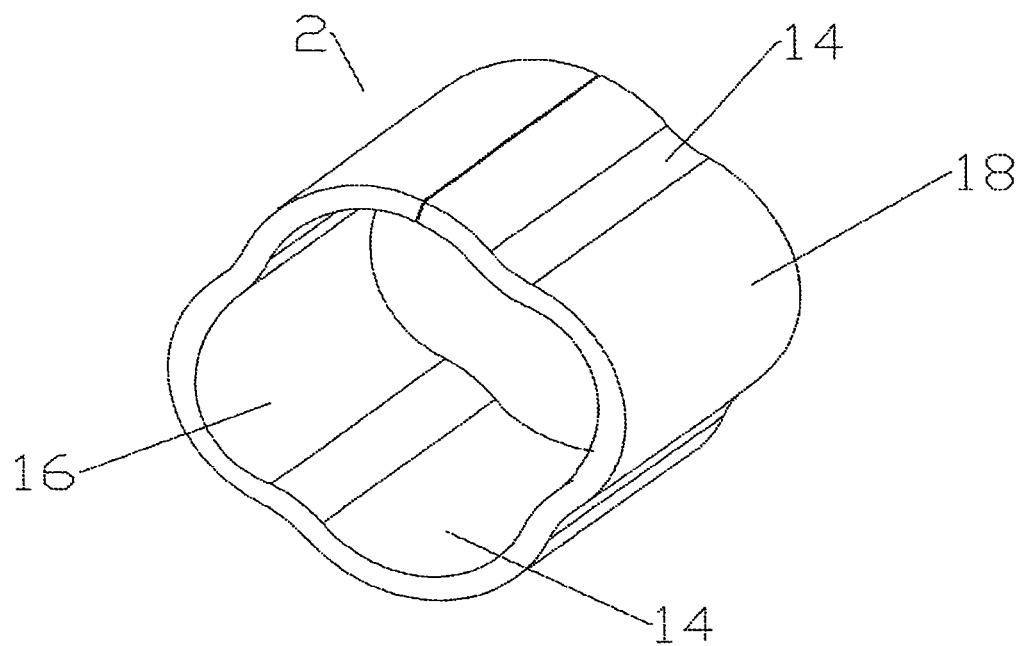
FIG. 6 is a schematic isometric view of the solder pre-form of FIG. 5 bent for enclosing a prepared end of a coaxial cable.
Figure 7:
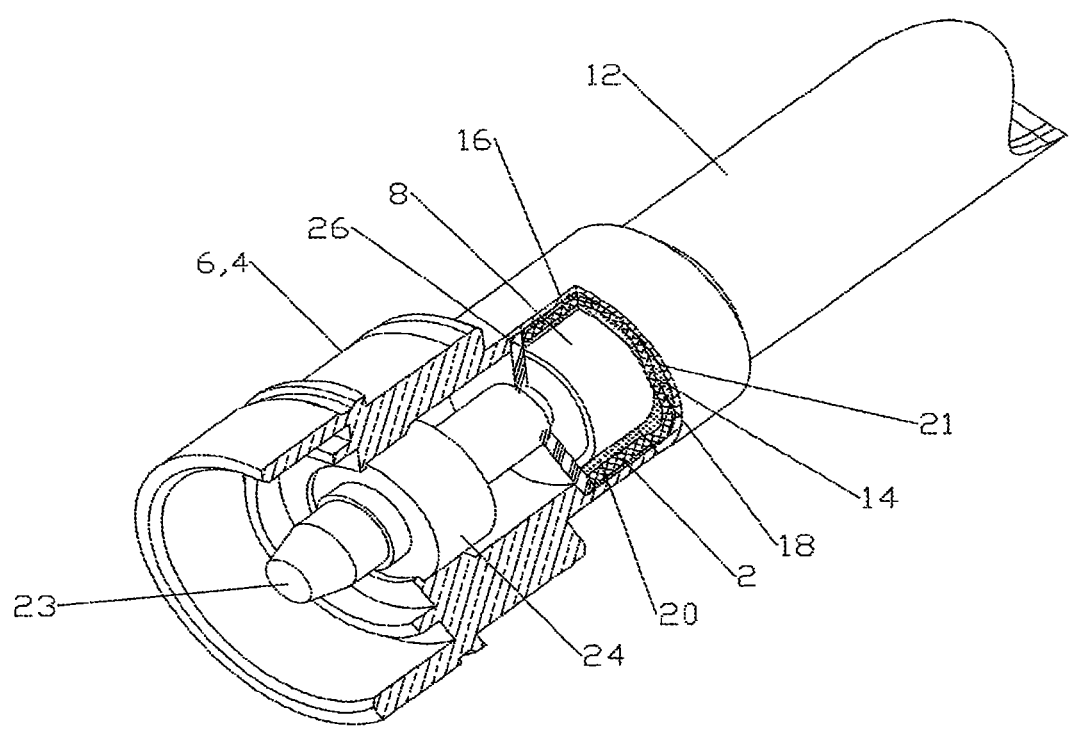
FIG. 7 is a schematic isometric partial cutaway view of the solder pre-form of FIG. 5 flux coated and seated upon the outer conductor, inserted within the connector body bore for soldering the coaxial connector to the coaxial cable.
Figure 8:
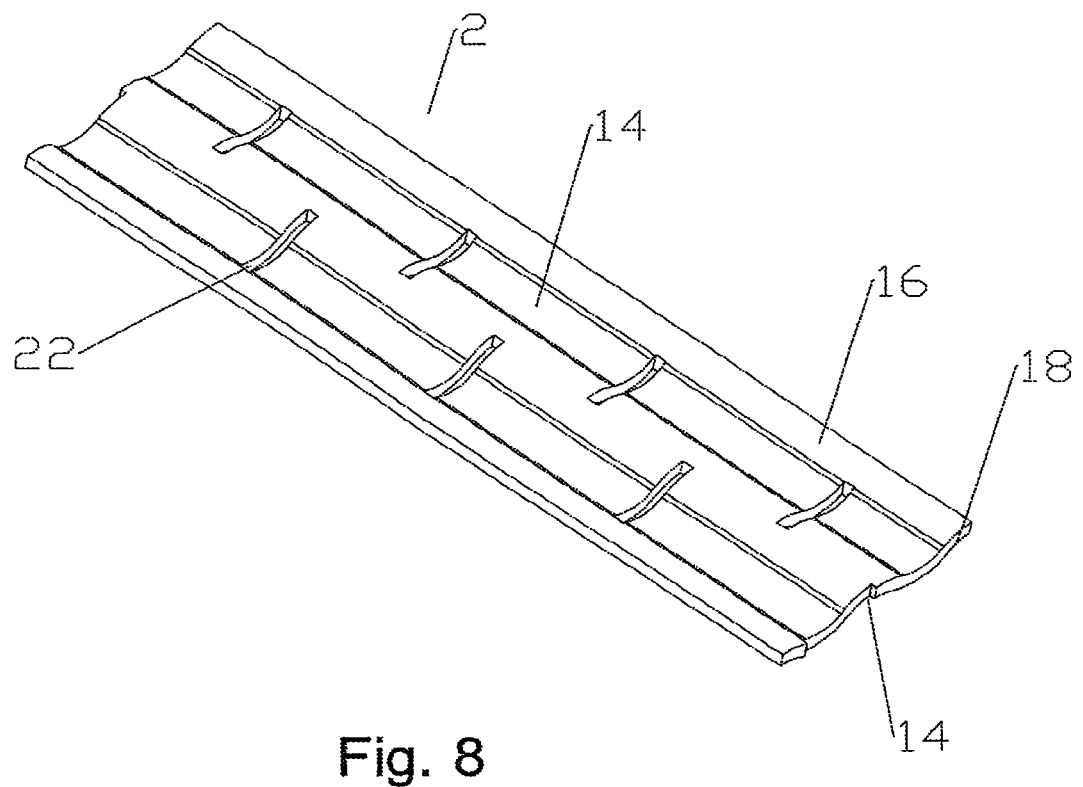
FIG. 8 is a schematic isometric view of an embodiment of a solder pre-form with rectangular holes.
Figure 9:
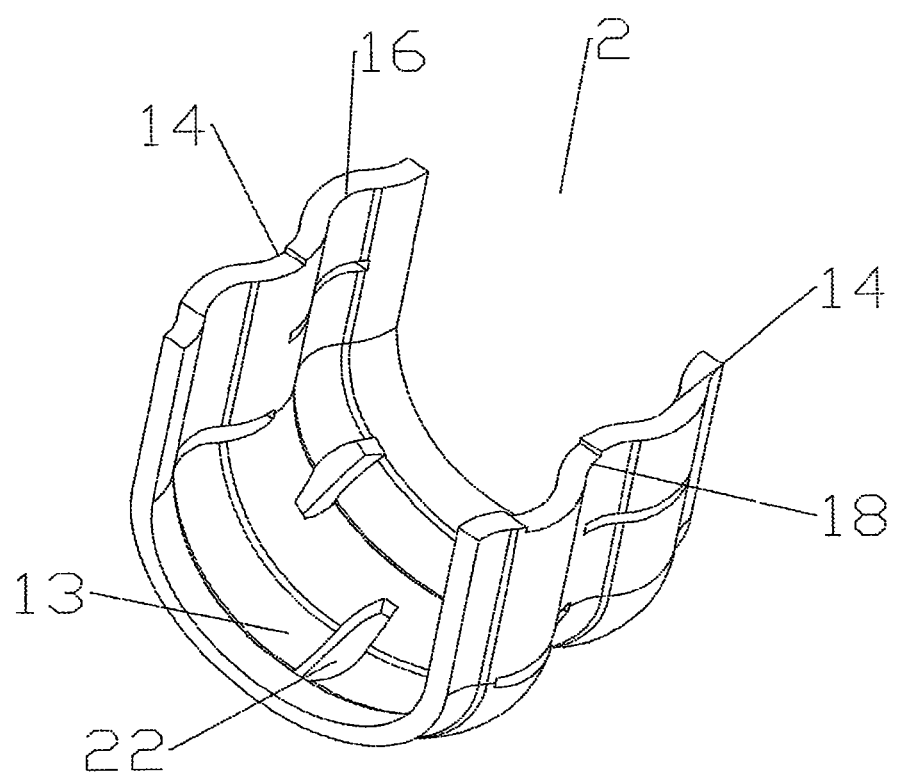
FIG. 9 is a schematic isometric view of the solder pre-form of FIG. 8 bent into a U-shape.
Figure 10:
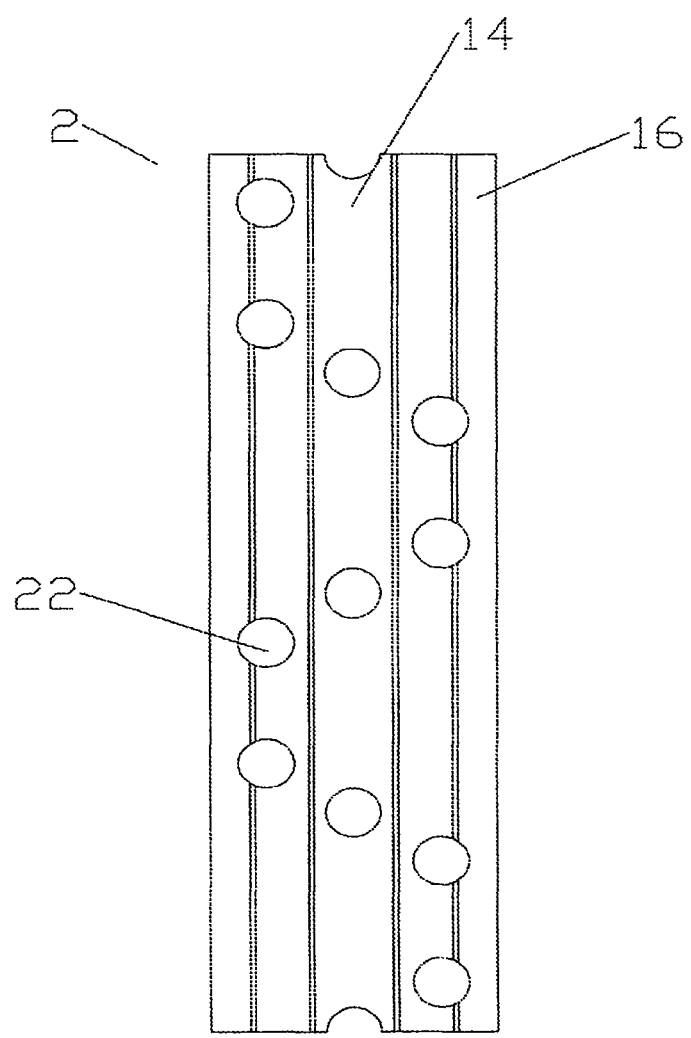
FIG. 10 is a schematic front view of an embodiment of a solder pre-form with round holes.
Figure 11:
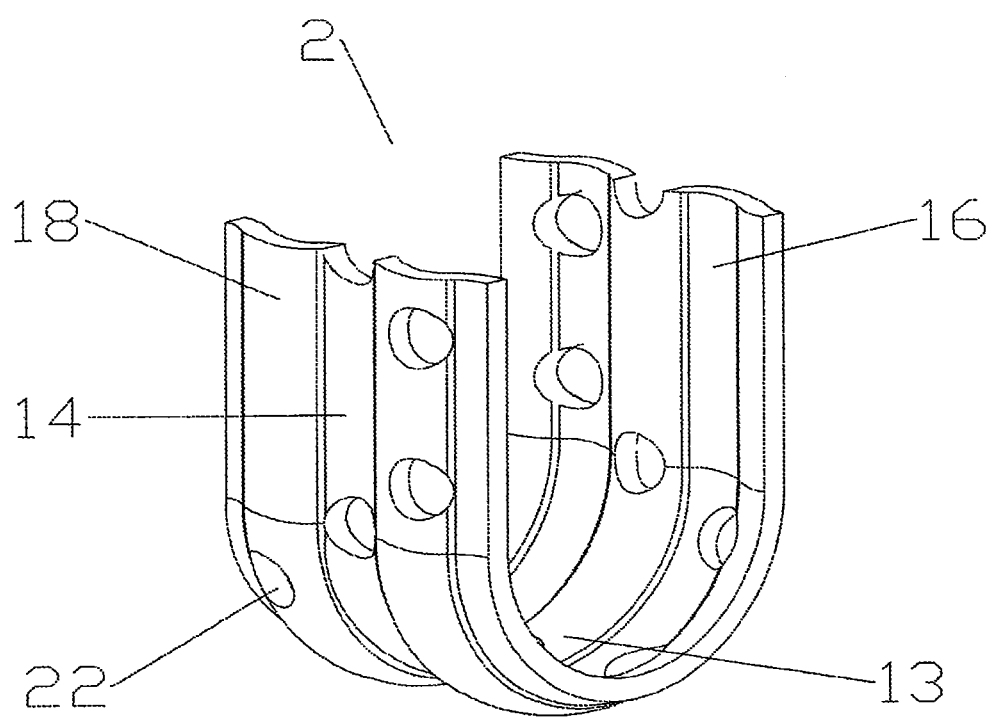
FIG. 11 is a schematic isometric view of the solder pre-form of FIG. 10 bent into a U-shape.
Figure 12:
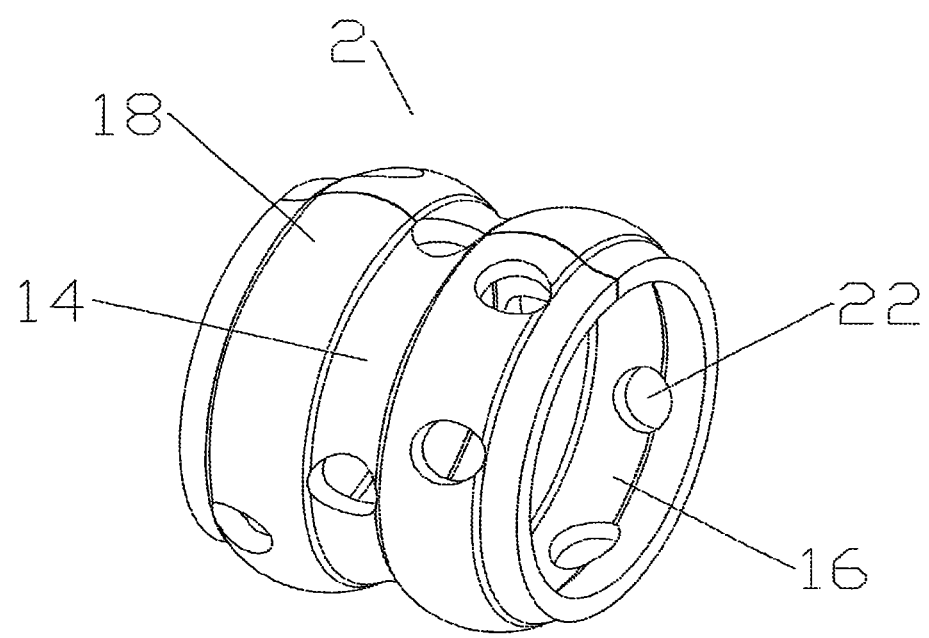
FIG. 12 is a schematic isometric view of the solder pre-form of FIG. 11 bent for enclosing a prepared end of a coaxial cable.

The solder pre-form 2 is provided with a plurality of flux grooves 14 on a cable side 16 and a connector side 18. The flux grooves 14 are operable for receiving and retaining viscous flux 20 during pre-assembly and insertion of the coaxial cable 12 into a connector body bore 21 of the connector body 4. The flux grooves 14 may be applied oriented parallel to a longitudinal axis of the solder pre-form 2, as best shown in FIGS. 1, 8 and 10, for seating upon the outer conductor 8 perpendicular to a longitudinal axis of the coaxial cable 12. Alternatively, the flux grooves 14 may be applied, for example, oriented perpendicular to a longitudinal axis of the solder pre-form 2 for seating upon the outer conductor 8 parallel to a longitudinal axis of the coaxial cable 12, for example as shown in FIGS. 5-7.

The flux grooves 14 on the cable side 16 and the flux grooves 14 on the connector side 18 may be provided, for example, by forming corrugations through a cross section of the solder pre-form 2 providing corresponding flux grooves 14 on each side. Thus, each flux groove 14 on the connector side 18 will be a trough corresponding to a crest on the cable side 16 and each flux groove 14 on the cable side 16 will be a trough corresponding to a crest on the connector side 18. Such corrugations may be formed by, for example, stamping, rolling and/or extruding the selected solder material.

One skilled in the art will appreciate that, when the flux grooves 14 are applied perpendicular to the longitudinal axis of the coaxial cable 12, a low viscosity flux 20 thereon may be temporarily retained therein while the coaxial cable is oriented vertically prior to soldering. Similarly, where the flux grooves 14 are oriented parallel to the coaxial cable 12 longitudinal axis a higher viscosity flux 20 may be retained and a direct vertical path is provided for egress of the volatized flux 20 out of the connector body bore 21 (see FIG. 6) as heating is initiated.

Figure 17:
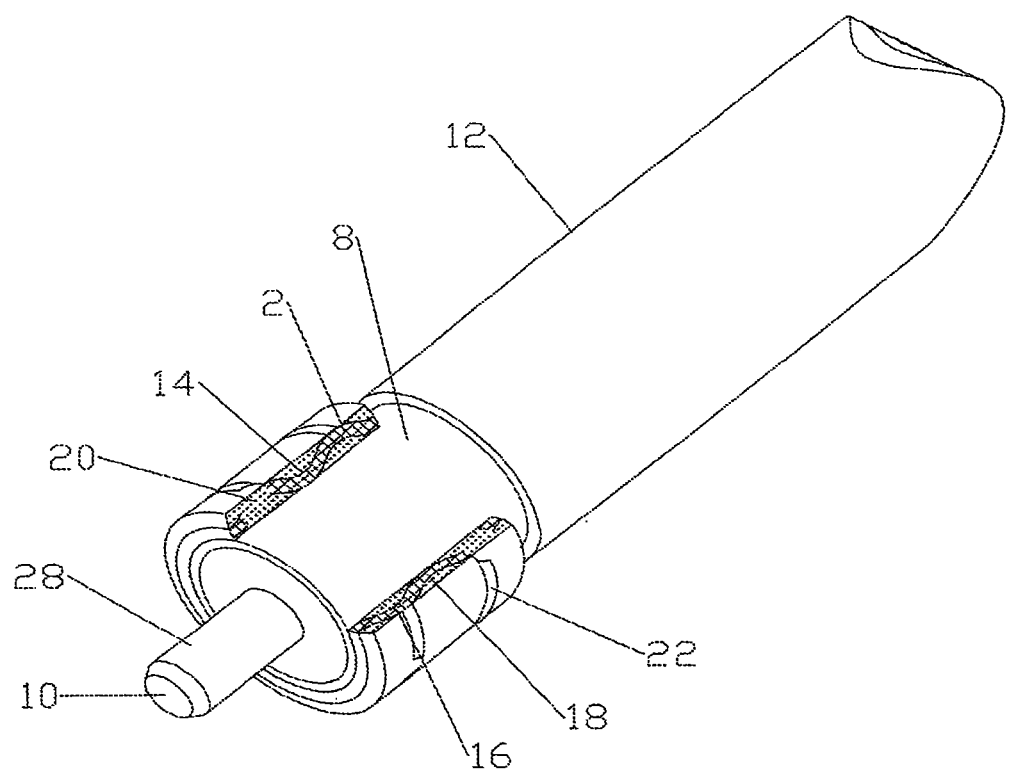
FIG. 17 is a schematic isometric partial cutaway view of the solder pre-form of FIG. 10 enclosing a coaxial cable.
Figure 18:
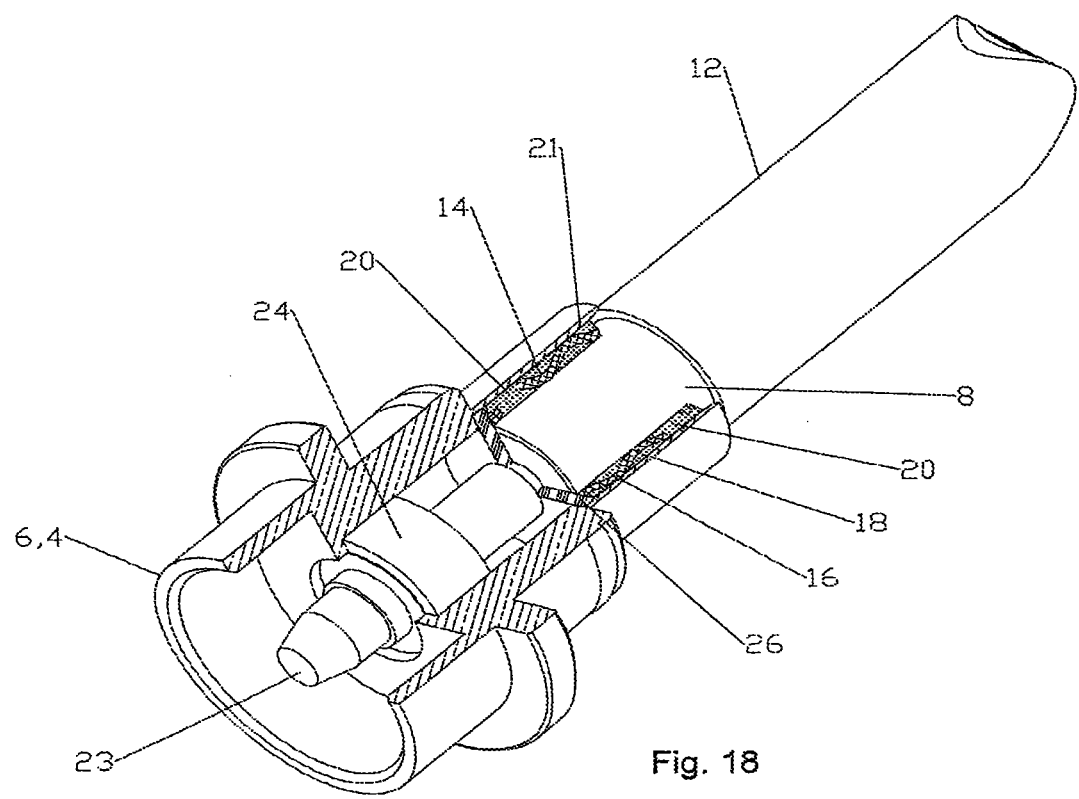
FIG. 18 is a schematic isometric partial cutaway view of the solder pre-form of FIG. 10 coupled between a coaxial connector and a coaxial cable prior to soldering.

In further embodiments, as shown for example in FIGS. 8-12, the solder pre-form 2 may be provided with a plurality of holes 22 to allow flux 20 to pass from the connector side 18 to the cable side 16. The holes 22 may, for example, be slots, as in FIGS. 8 and 9, or circular, as in FIGS. 10-12. The holes 22 provide communication between the connector side 18 and the cable side 16, whereby flux 20 applied to the connector side 18 also passes through the holes 22 to also fill the flux grooves 14 on the cable side. As the holes 22 enable flux 20 passage from the connector side 18 to the cable side 16, manual application of flux 20 to the flux grooves 14 of the connector side 18 prior to encircling the outer conductor 8 with the solder pre-form 2 may be eliminated, for example as shown in FIGS. 17 and 18. Without the need for applying the flux 20 directly to the connector side 16, the pre-form 2 may be supplied pre-formed in an annular configuration as shown for example in FIG. 12 to further simplify and/or eliminate a step of bending of the solder pre-form 2 around the outer conductor 8 during pre-assembly. To increase the solder pre-form solder volume while maintaining the connector side to cable side flux transmission functionality, the holes 20 may be formed as slots oriented normal to the solder pre-form longitudinal axis (see FIGS. 8 and 9).

Similarly, one or more holes 22 may be positioned along sidewalls of the flux grooves 14 to form an egress path through the solder pre-form 2 for the volatized flux between each flux groove 14 and out of the connector body bore 21 during initial heating of the soldering procedure, which may reduce the generation of flux 20 and/or air pockets and the associated entrapment and/or sputtering of such through molten solder during soldering.

In an exemplary method using the solder pre-form 2 of the first embodiment, a coaxial cable 12 with a smooth outer conductor 8 is soldered with a connector body 4, for example wherein the connector body 4 and/or the smooth sidewall outer conductor 8 are each made of aluminum material. Aluminum material may be aluminum, aluminum alloy or a surface coating of aluminum or aluminum alloy.

Figure 4:
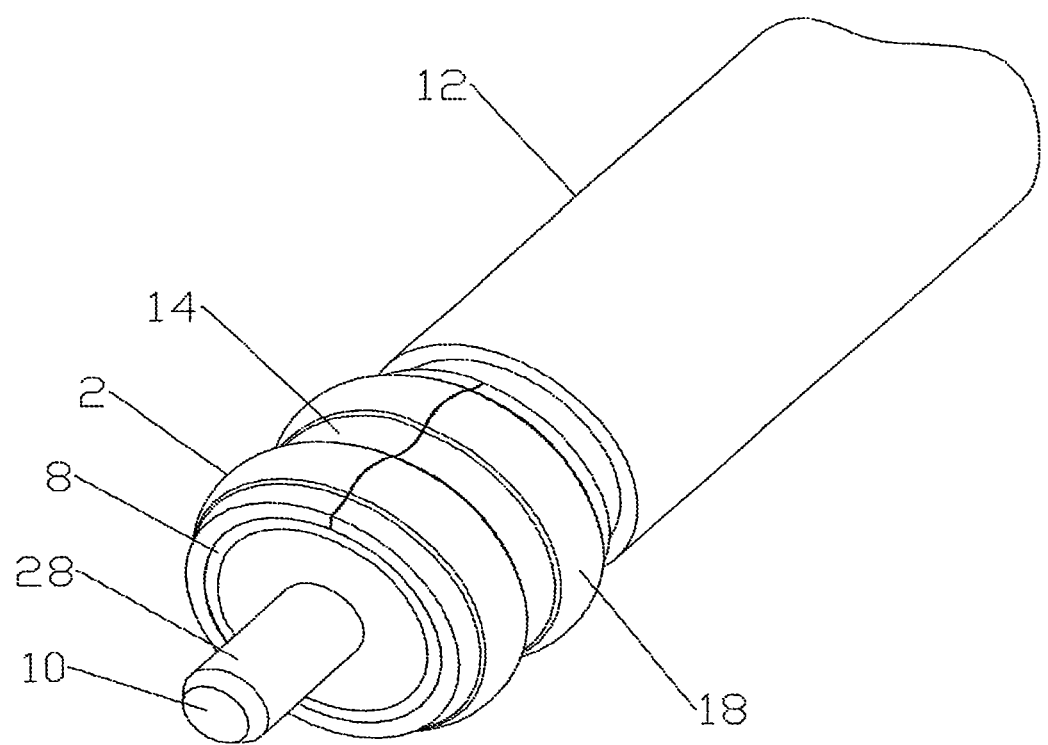
FIG. 4 is a schematic isometric view of the solder pre-form of FIG. 3 after bending into an annulus for enclosing the outer diameter of the outer conductor of a prepared end of a coaxial cable.
Figure 13:
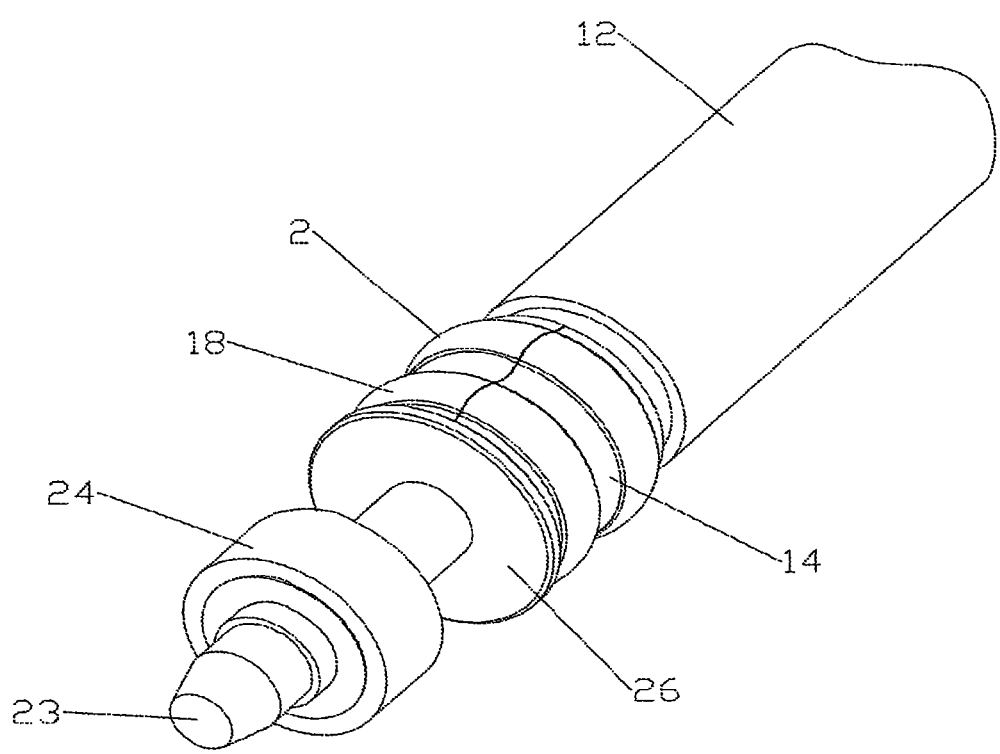
FIG. 13 is a schematic isometric view of the solder pre-form of FIG. 1 enclosing a prepared end of a coaxial cable.

The flux grooves 14 on a cable side 16 of a U-shaped solder pre-form 2 are filled with flux 20, for example as shown in FIG. 3. The first and second ends of the solder pre-form 2 are bent toward each other to enclose the outer diameter of the outer conductor 8 of a prepared end 10 of a coaxial cable 12, for example as shown in FIG. 4. An inner contact 23, insulator 24 and/or disc 26 may be coupled with the prepared end 10 of the coaxial cable 12, for example as shown in FIG. 13. Specifically, the inner contact 23, carrying the insulator 24 and disc 26, may be coupled with the inner conductor 28 via, for example, inward-biased spring contacts of the inner contact 23 and/or a further solder procedure between the inner contact 23 and the inner conductor 28.

Figure 14:
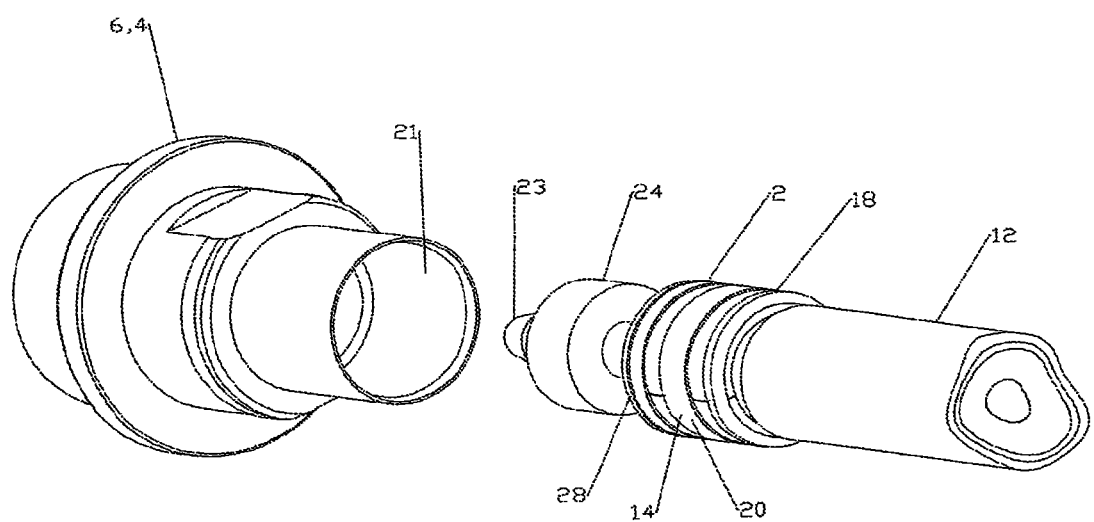
FIG. 14 is a schematic isometric view of the solder pre-form of FIG. 1 enclosing a prepared end of a coaxial cable prior to insertion into a coaxial connector.
Figure 15:
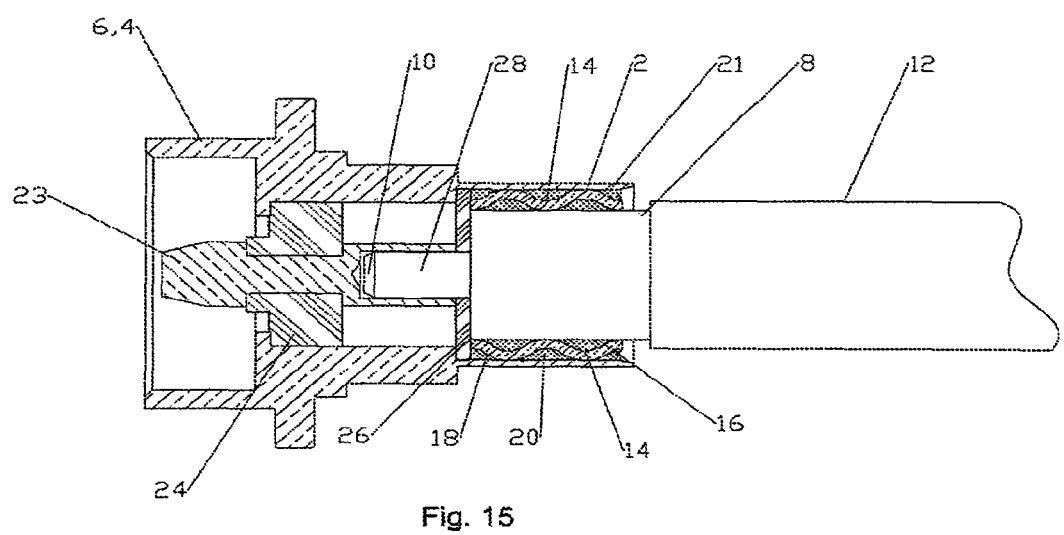
FIG. 15 is a schematic cross-section side view of the solder pre-form of FIG. 1 coupled between a coaxial connector and a coaxial cable prior to soldering.
Figure 16:
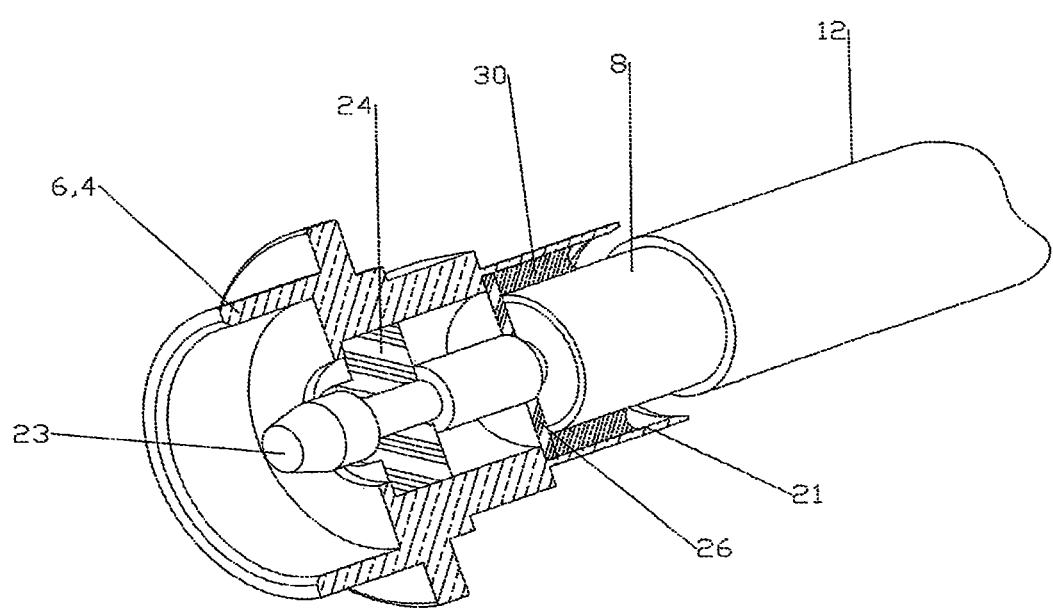
FIG. 16 is a schematic isometric partial cutaway cross-section view of the solder pre-form of FIG. 1 coupled between a coaxial connector and a coaxial cable after soldering.

The plurality of flux grooves 14 on the connector side 18 are filled with flux 20, for example as shown in FIG. 14. The coaxial cable 12 coupled with the solder pre-form 2 is then inserted into the connector body bore 21 of the connector body 4, for example as shown in FIG. 15. The combined connector body 4 and coaxial cable 13 may be securely held vertically, with the connector body 4 on the bottom, for example in a soldering apparatus as disclosed in commonly owned U.S. Pat. No. 7,900,344 issued Mar. 8, 2011 to Ng et al. Heat is applied to an outer surface of the connector body 4, volatizing the flux 20 and then melting the solder perform 2, which pools the solder 30 between the connector body bore 21 and the outer conductor 8. Upon cooling, the solder interconnection is completed, for example as shown in FIG. 16.

As described herein above, because flux applied to the connector side 18 can pass through the holes 22 to the connector side 18, a pre-form 2 with holes 22 enables elimination of the step of applying flux directly to the cable side 16, simplifying the method of use. Further, the edges of the holes 22 may provide a grip surface for enhancing a hold of the solder pre-form 2 in place upon the outer conductor 8 during vertical insertion into the connector body bore 21.

Where the solder pre-form 2 is dimensioned to create an interference fit between the pre-form 2 and the outer conductor 8, the pre-form 2 grips the outer conductor 8 prior to insertion of the prepared end of the coaxial cable 12, with the solder pre-form 2 attached, into the connector body bore 21, simplifying the pre-assembly process.

Further, where the corrugation peaks of the connector side of the pre-form 2 also fit with an interference fit against the connector body bore 21, thermal conductivity through the solder pre-form 2 to the outer conductor 8 is improved, which reduces thermal requirements of the solder process. Thereby, the possibility of thermal damage to adjacent non-soldered elements such as the jacket and coaxial cable dielectric insulation is reduced and the process solderability is improved by reducing the time between the first application of heat (which initiates flux 20 melting) and then, as heat transfer to and through the solder pre-form 2 increases, melting of the solder 30 which completes the solder operation. Because the time between flux 20 melting and solder 30 melting is reduced when thermal conductivity through the assembly is improved, there is less chance of all flux 20 being entirely evaporated and/or burned away from a desired interconnection surface, before the solder 30 melts.

One skilled in the art will appreciate that a solder pre-form 2 according to the invention may improve connector body to outer conductor solder connection quality, especially where aluminum materials are being utilized. Thereby, the further adoption of aluminum material use in the coaxial connector and/or coaxial cable arts is enabled, which in turn may enable significant material cost savings for connector and coaxial cable manufacturers.

| Table of Parts | |
|---|---|
| 2 | solder pre-form |
| 4 | connector body |
| 6 | coaxial connector |
| 8 | outer conductor |
| 10 | prepared end |
| 12 | coaxial cable |
| 13 | base |
| 14 | flux grooves |
| 16 | cable side |
| 18 | connector side |
| 20 | flux |
| 21 | connector body bore |
| 22 | hole |
| 23 | inner contact |
| 24 | insulator |
| 26 | disc |
| 28 | inner conductor |
| 30 | solder |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A method for soldering a coaxial cable with a coaxial connector, comprising the steps of:
   applying a flux to a plurality of flux grooves of a cable side of a solder pre-form;
   applying the solder pre-form around an outer conductor of the coaxial cable, whereby the solder pre-form at least partially encircles the outer conductor;
   applying flux to a plurality of flux grooves of a connector side of the solder pre-form;
   inserting the coaxial cable with the solder pre-form thereon into a connector body bore of the coaxial connector; and
   melting the solder pre-form, wherein the solder pre-form includes a plurality of holes; the holes communicating between the cable side and the connector side.

2. The method of claim 1, wherein the holes are slots perpendicular to a longitudinal axis of the solder pre-form.

3. The method of claim 1, wherein the flux is viscous in the plurality of flux grooves of the cable side of the solder pre-form during the step of applying the solder pre-form around the outer conductor.

4. The method of claim 1, wherein the step of applying flux to the plurality of flux grooves of the connector side of the solder pre-form occurs after the step of applying the solder pre-form around the outer conductor of the coaxial cable.

5. The method of claim 1, wherein the flux applied to the connector side of the solder pre-form is viscous during the step of inserting the coaxial cable with the solder pre-form thereon into the connector body bore of the coaxial connector.

6. A method for soldering a coaxial cable with a coaxial connector, comprising the steps of:
   applying a flux to a plurality of flux grooves of a cable side of a solder pre-form;
   applying the solder pre-form around an outer conductor of the coaxial cable, whereby the solder pre-form at least partially encircles the outer conductor;
   applying flux to a plurality of flux grooves of a connector side of the solder pre-form;
   inserting the coaxial cable with the solder pre-form thereon into a connector body bore of the coaxial connector; and
   melting the solder pre-form;

wherein the flux is viscous in the plurality of flux grooves of the cable side of the solder pre-form during the step of applying the solder pre-form around the outer conductor.

7. A method for soldering a coaxial cable with a coaxial connector, comprising the steps of:
　applying a flux to a plurality of flux grooves of a cable side of a solder pre-form;
　applying the solder pre-form around an outer conductor of the coaxial cable, whereby the solder pre-form at least partially encircles the outer conductor;
　applying flux to a plurality of flux grooves of a connector side of the solder pre-form;
　inserting the coaxial cable with the solder pre-form thereon into a connector body bore of the coaxial connector; and
　melting the solder pre-form;
　wherein the flux applied to the connector side of the solder pre-form is viscous during the step of inserting the coaxial cable with the solder pre-form thereon into the connector body bore of the coaxial connector.

8. A method for soldering a coaxial cable with a coaxial connector, comprising the steps of:
　applying a flux to a plurality of flux grooves of a cable side of a solder pre-form;
　applying the solder pre-form around an outer conductor of the coaxial cable, whereby the solder pre-form at least partially encircles the outer conductor;
　applying flux to a plurality of flux grooves of a connector side of the solder pre-form;
　inserting the coaxial cable with the solder pre-form thereon into a connector body bore of the coaxial connector; and
　melting the solder pre-form;
　wherein the step of applying flux to the plurality of flux grooves of the connector side of the solder pre-form occurs after the step of applying the solder pre-form around the outer conductor of the coaxial cable.

9. The method of claim 8, wherein the solder pre-form is U-shaped; the solder pre-form applied to encircle the outer conductor by bending first and second ends of the solder pre-form towards one another around the outer conductor.

10. The method of claim 9, wherein the bending is performed with a hand tool.

11. The method of claim 8, wherein the outer conductor and the coaxial connector are one of aluminum and aluminum alloy.

12. The method of claim 8, further including the step of installing an inner contact upon an inner conductor of the coaxial cable.

13. The method of claim 12, further including the step of installing an insulator onto the inner contact.

14. The method of claim 8, wherein the flux grooves extend along a longitudinal axis of the solder pre-form.

15. The method of claim 8, wherein the flux grooves extend perpendicular to a longitudinal axis of the solder pre-form.

16. The method of claim 8, wherein the flux grooves are formed by corrugations of the solder pre-form.

17. The method of claim 9, wherein a bend radius of the solder pre-form is dimensioned to seat upon an outer diameter of an outer conductor of the coaxial cable.

18. The method of claim 9, wherein a bend radius of the solder pre-form is dimensioned for an interference fit upon an outer diameter of an outer conductor of the coaxial cable.

* * * * *